United States Patent
Moriya

(10) Patent No.: US 7,486,352 B2
(45) Date of Patent: Feb. 3, 2009

(54) COLOR FILTER WITH RETARDATION LAYER AND LIQUID CRYSTAL DISPLAY

(75) Inventor: Norihisa Moriya, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 224 days.

(21) Appl. No.: 10/586,844

(22) PCT Filed: Sep. 8, 2005

(86) PCT No.: PCT/JP2005/016990

§ 371 (c)(1), (2), (4) Date: Jul. 20, 2006

(87) PCT Pub. No.: WO2006/028275

PCT Pub. Date: Mar. 16, 2006

(65) Prior Publication Data

US 2007/0159581 A1    Jul. 12, 2007

(30) Foreign Application Priority Data

Sep. 8, 2004    (JP)    ............................. 2004-260920

(51) Int. Cl.
G02F 1/1335    (2006.01)
(52) U.S. Cl. ................... 349/106; 349/117; 349/118; 349/119; 349/129; 349/187
(58) Field of Classification Search .................. None
See application file for complete search history.

(56) References Cited

U.S. PATENT DOCUMENTS

| | | | |
|---|---|---|---|
| 6,169,590 B1 * | 1/2001 | Abileah et al. ............... | 349/120 |
| 6,593,981 B1 * | 7/2003 | Haim et al. .................. | 349/106 |
| 7,330,232 B2 * | 2/2008 | Jeon et al. .................... | 349/119 |
| 2004/0156001 A1 | 8/2004 | Moriya | |
| 2005/0068479 A1 * | 3/2005 | Moriya ........................ | 349/117 |
| 2005/0142464 A1 * | 6/2005 | Moriya .......................... | 430/7 |

FOREIGN PATENT DOCUMENTS

| | | |
|---|---|---|
| EP | 1 118 885 | 7/2001 |
| JP | 10-153802 | 6/1998 |
| JP | 2003-315550 | 11/2003 |
| WO | WO 2004/068225 | 8/2004 |

* cited by examiner

Primary Examiner—Tina M Wong
(74) Attorney, Agent, or Firm—Ladas & Parry LLP

(57) ABSTRACT

The main object of the present invention is to provide a colour filter with a retardation layer, capable of minimizing light leakage even in the case the visual angle is large in the black display state, for a liquid crystal display. The present invention achieves the object by providing a colour filter with a retardation layer comprising a substrate, a colour layer formed on the substrate, being arranged in a plurality of rows having different thicknesses according to each colour, a first retardation layer formed on the colour layer, made of a liquid crystalline polymer, having its optic axis perpendicular to a plane of the substrate so as to function as a C plate, and a second retardation layer the colour layer, wherein the optic axis of the second retardation layer is arranged parallel to the plane of the substrate so as to function as a positive Aplate with positive refractive index anisotropy, and the refractive index anisotropy of the second retardation layer in the visible light range decreases at shorter wavelengths inverse dispersion characteristics.

12 Claims, 3 Drawing Sheets

COLOR FILTER WITH RETARDATION LAYER AND LIQUID CRYSTAL DISPLAY

TECHNICAL FIELD

The present invention relates to a color filter with a retardation film having a retardation layer for improving the visual angle, suitable for a liquid crystal display for the color display, and a liquid crystal display.

BACKGROUND ART

Owing to the characteristics of the liquid crystal display (hereinafter it is also referred to as the LCD) for the color display such as the thin shape, the light weight, the power consumption saving and the flickerless, the market thereof has rapidly been expanded mainly for the laptop type personal computers. Recently, as a part of such a display apparatus for the personal computers, demand for the monitors for the desktop type personal computers larger than the laptop type personal computers has been generated. Moreover, not only for the personal computer application, the LCD has been utilized also for the televisions, for which the cathode ray tube (CRT) has conventionally been the mainstream.

Here, as the problems peculiar to the LCD, its narrow visual angle issue can be presented. This is due to the light leakage generated from the pixels, which originally should display the black, in the case the LCD is observed from the oblique direction. Therefore, the contrast inversion is generated so that the correct display cannot be achieved. In view of the problem, a wide visual angle LCD without the light leakage even in the case the visual angle is increased in the black display pixels using the retardation layer has been studied.

For example, according to the liquid crystal display device of the vertical alignment mode, for improving the visual angle characteristics, as described in the Japanese Patent Application Laid Open (JP-A) No. 10-153802, a retardation layer having the optical axis perpendicular to the substrate with the negative birefringence anisotropy (negative C plate), and a retardation layer having the optical axis parallel to the substrate with the positive birefringence anisotropy (positive A plate) are used in a combination.

In the same manner, according to the liquid crystal display device of the horizontal alignment mode, by using a retardation layer having the optical axis perpendicular to the substrate with the positive birefringence anisotropy (positive C plate), and a retardation layer having the optical axis parallel to the substrate with the positive birefringence anisotropy (positive A plate), the optical compensation can be enabled. Since the optical compensation of the liquid crystal display device of the horizontal alignment mode is the optical compensation of the polarizing plates in the crossed Nicol state, this method can widely be adopted for the liquid crystal display device utilizing the polarizing plate in the crossed Nicol state.

Conventionally, as the retardation layer, except the positive C plate, a transparent polymer film with the stretching process applied has widely been adopted. Moreover, all the retardation layers can be produced also by aligning and fixing a liquid crystal material having the refractive index anisotropy with the certain regularity. In particular, as to the positive C plate, it cannot be produced by the stretching process of a polymer so that it can substantially be produced only by using the liquid crystal material.

Here, in the case of the optical compensation over the entire visual light range at a certain observation angle, a problem is involved in that the retardation amount required to the retardation layer differs depending on every wavelength. According to the optical compensation using the retardation layer, since the wavelength dependency of the retardation amount is determined by the characteristics of the material comprising the retardation layer, in general the optical design is provided with the green color, which has the highest visual sensitivity. In this case, since the accurate optical compensation cannot be realized for the red color and the blue color, if the visual angle is made larger in the black display state, the light leakage of the red color and the blue color becomes conspicuous so that a problem arises in that it is observed for the reddish purple color, or the like.

Here, for example in the JP-A No. 2003-315550, a retardation layer having the so-called inverse dispersion characteristics with the refractive index anisotropy on the longer wavelength side of the visual light range larger than the refractive index on the shorter wavelength side has been proposed. However, the retardation layer in the JP-A No. 2003-315550 is produced by aligning the polymer so that a retardation layer using the liquid crystal material having the inverse dispersion characteristics has never been developed.

DISCLOSURE OF THE INVENTION

The present invention has been achieved in view of the problems. The main object of the invention is to provide a color filter with a retardation layer, using a retardation layer as a C plate with a liquid crystal material used and a retardation layer as an A plate, capable of restraining the light leakage generation even in the case the visual angle is increased in the black display state, and a liquid crystal display.

As a result of the elaborate discussion on the circumstances, the present inventors have found out that the optimum retardation amount can be realized for each color by changing the thicknesses of the red, green and blue light transmissive patterns of the coloring layers respectively, and forming a retardation layer using a liquid crystal material on each color light transmissive pattern having the different thicknesses. Furthermore, they have found out that the light leakage generation of a purple color, or the like can be prevented by combining the retardation layer using the liquid crystal material and a retardation layer having the inverse dispersion characteristics even in the case the visual angle is increased in the black display state so as to complete the present invention.

That is, the present invention provides a color filter with a retardation layer comprising a base material, a coloring layer formed on the base material, with light transmissive patterns having different thicknesses according to each color formed in a plurality of rows, a first retardation layer formed on the coloring layer, made of a liquid crystalline polymer, having the optical axis perpendicular to a plane of the base material so as to function as a C plate, and a second retardation layer formed on a side opposite to a side with the coloring layer of the base material formed, or between the base material and the coloring layer, having an optical axis parallel to the plane of the base material so as to function as a positive A plate having the positive refractive index anisotropy, characterized in that the refractive index anisotropy of the second retardation layer in the visible light range becomes smaller with a shorter wavelength.

According to the present invention, as to the first retardation layer to function as a C plate, since the thicknesses of the light transmissive patterns of each color for the coloring layer differ according to the color, the retardation amount corresponding to the wavelength of each color can be obtained. Moreover, as to the second retardation layer to function as a positive A plate, since the second retardation layer has the so-called inverse dispersion characteristics, the retardation amount corresponding to the wavelength of each color can be obtained. Therefore, even in the case the visual angle is increased in the black display state, the light leakage such as to be observed as a purple color, or the like can be restrained effectively.

In the invention, it is preferable that the total of a thickness of the coloring layer and a thickness of the first retardation layer is constant, and the thickness of the first retardation layer differs according to a thickness of the light transmissive pattern. Thereby, the optimum retardation amount according to the wavelength of each color can be provided to the first retardation layer.

At the time, it is possible that the coloring layer comprises the light transmissive patterns of three colors including red, green and blue, and the thicknesses of the light transmissive patterns for the three colors are provided in the order of red>green>blue. Alternatively, the thicknesses of the light transmissive patterns for the three colors may be provided in the order of blue>green>red. Thereby, the light leakage can be restrained effectively in the all wavelength range of red, green and blue.

Moreover, the present invention provides a liquid crystal display comprising a first polarizing plate and a second polarizing plate with the absorption axes provided orthogonal with each other, between the first polarizing plate and the second polarizing plate are provided a color filter comprising a base material, a coloring layer formed on the base material, with light transmissive patterns having different thicknesses according to each color formed in a plurality of rows, a first retardation layer formed on the coloring layer, made of a liquid crystalline polymer, having an optical axis perpendicular to a plane of the base material so as to function as a C plate, a second retardation layer, having an optical axis parallel to the plane of the base material so as to function as a positive A plate having the positive refractive index anisotropy, and a liquid crystal layer, characterized in that the first polarizing plate, the second retardation layer, the first retardation layer and the second polarizing plate are formed in this order such that the optical axis of the second retardation layer and the absorption axis of the first polarizing plate are disposed substantially perpendicularly, and the refractive index anisotropy of the second retardation layer in the visible light range becomes smaller with a shorter wavelength.

According to the present invention, as mentioned above, since the thicknesses of each color light transmissive pattern of the coloring layer differ according to the color, the optimum retardation can be provided to the first retardation layer formed on the coloring layer. Moreover, since the second retardation layer has the so-called inverse dispersion characteristics, the optimum retardation can be provided also to the second retardation layer. Thereby, even in the case the liquid crystal display is observed obliquely, generation of the light leakage can be prevented.

According to the invention, it is possible that the liquid crystal layer is formed between the color filter and the second polarizing plate, and the second retardation layer is formed on a side opposite to a side with the coloring layer formed of the base material of the color filter, or between the base material of the color filter and the coloring layer. Moreover, it is also possible that the liquid crystal layer is formed between the second retardation layer and the color filter. According to the configuration, the visual angle characteristics of the liquid crystal display of the present invention can be improved.

Moreover, according to the present invention, it is preferable that the total of a thickness of the coloring layer and a thickness of the first retardation layer is constant, and the thickness of the first retardation layer differs according to a thickness of the light transmissive pattern. Thereby, the optimum retardation amount according to the wavelength of each color can be provided to the first retardation layer.

At the time, it is possible that the coloring layer comprises the light transmissive patterns of three colors including red, green and blue, and the thicknesses of the light transmissive patterns for the three colors are provided in the order of red>green>blue. Alternatively, the thicknesses of the light transmissive patterns for the three colors may be provided in the order of blue>green>red. Thereby, the light leakage can be restrained effectively in the all wavelength range of red, green and blue.

In the present invention, since the thicknesses of each color light transmissive pattern of the coloring layer differ according to the color in the first retardation layer and one having the inverse dispersion characteristics is used as the second retardation layer, the optical compensation can be enabled without accompanying the wavelength dispersion. Therefore, the effect of effectively restraining the light leakage in the all wavelength region so that a high contrast high quality display can be obtained even in the case the visual angle is increased in the black display state can be achieved.

BEST MODE FOR CARRYING OUT THE INVENTION

Hereinafter, a color filter with a retardation layer and a liquid crystal display of the present invention will be explained in detail.

A. Color Filter with a Retardation Layer

First, a color filter with a retardation layer of the present invention will be explained. The color filter with a retardation layer of the present invention comprises a base material, a coloring layer formed on the base material, with light transmissive patterns having different thicknesses according to each color formed in a plurality of rows, a first retardation layer formed on the coloring layer, made of a liquid crystalline polymer, having the optical axis perpendicular to a plane of the base material so as to function as a C plate, and a second retardation layer formed on a side opposite to a side with the coloring layer of the base material formed, or between the base material and the coloring layer, having the optical axis parallel to the plane of the base material so as to function as a positive A plate having the positive refractive index anisotropy, characterized in that the refractive index anisotropy of the second retardation layer in the visible light range becomes smaller with a shorter wavelength.

The color filter with a retardation layer according to the present invention will be explained with reference to the drawings.

Figure 1:
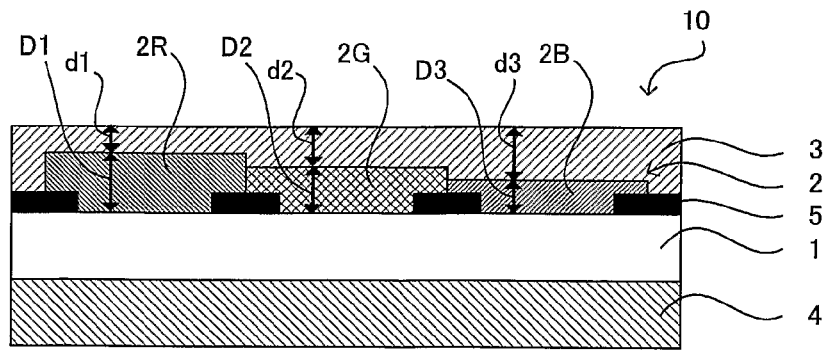
FIG. 1 is a schematic cross-sectional view showing an example of a color filter with a retardation layer according to the present invention.

FIG. 1 is a schematic cross-sectional view showing an example of a color filter with a retardation layer of the present invention. As shown in FIG. 1, the color filter with a retardation layer 10 of the present invention has a coloring layer 2 comprising light transmissive patterns of three colors of a red light transmissive pattern 2R, a green light transmissive pattern 2G and a blue light transmissive pattern 2B arranged in a row, formed at a position corresponding to a pixel part on a base material 1. A first retardation layer 3, made of a liquid crystalline polymer, to function as a C plate is formed on the coloring layer 2. Furthermore, a second retardation layer 4, to function as a positive A plate is formed on a side opposite to the side with the coloring layer 2 of the base material 1 formed. Moreover, a black matrix 5 is formed at a position corresponding to a non pixel part of the base material 1.

The thicknesses D1, D2 and D3 of the red, green and blue light transmissive patterns 2R, 2G and 2B respectively of the coloring layer 2 in the present invention are provided such that the thickness D1 of the red light transmissive pattern 2R is the thickest, and the thickness D2 of the green light transmissive pattern 2G and the thickness D3 of the blue light transmissive pattern 2B become thinner in this order so that the thicknesses differ with each other. That is, the light transmissive patterns 2R, 2G and 2B have thicknesses different with each other according to the color. Moreover, the first retardation layer 3 has the optical axis perpendicular to the base material 1 plane, with the upper side thereof providing the plane parallel to the upper side of the base material 1. As a result, as to the thickness of the first retardation layer 3 on the coloring layer 2, the thickness d1 on the red light transmissive pattern 2R is the thinnest, and the thickness d2 on the green light transmissive pattern 2G and the thickness d3 on the blue light transmissive pattern 2B become thicker in this order.

Figure 2:
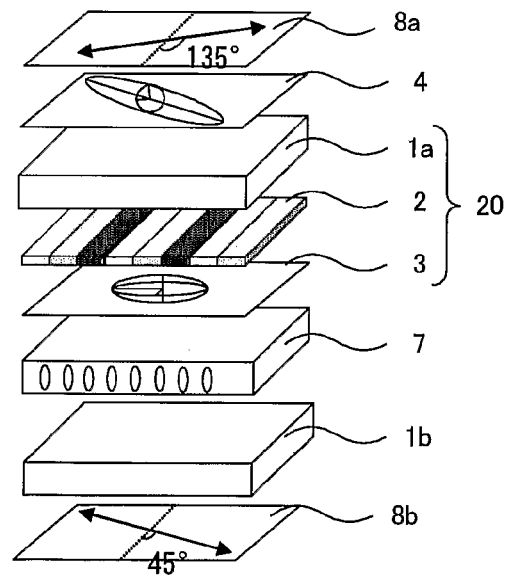
FIG. 2 is a schematic diagram showing an example of a liquid crystal display of the present invention.
Figure 3:
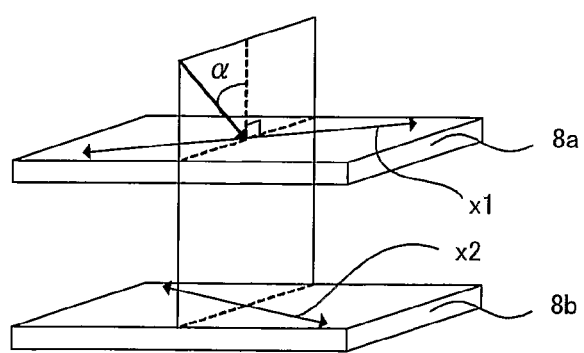
FIG. 3 is an explanatory diagram for explaining the method for measuring the retardation amount.

Here, an example of the case with the first retardation layer functioning as a negative C plate and the color filter with a retardation layer 10 of the present invention is used for example for a vertical alignment mode liquid crystal display as shown in FIG. 2 will be explained. Out of the two polarizing plates 8a, 8b, the absorption axis of the observation side polarizing plate 8a is in the 135° counterclockwise direction from the front side to the back side of the figure, and the absorption axis of the rear side polarizing plate 8b is in the 45° counterclockwise direction from the front side to the back side of the figure so that the absorption axes of the two polarizing plates 8a and 8b are orthogonal with each other. FIG. 2 is for showing the relative positional relationship of the layers, and thus the layers are not separated as shown in the figure. According to the liquid crystal display, at the time of the black display (voltage off), for example as shown in FIG. 3, in the case of observing at the azimuth at the center of the angle formed by the absorption axes x1, x2 of the two polarizing plates 8a, 8b and the observation pole angle α of 60°, the retardation amount necessary for the optical compensation is shown in the table 1 below concerning the red color (650 nm), the green color (550 nm) and the blue color (450 nm) for each of the first retardation layer (negative C plate) 3 and the second retardation layer (positive A plate) 4. In the table 1, as to the negative C plate retardation amount, the retardation amount at the time of observing the negative C plate by a 60° observation pole angle is shown, and as to the positive A plate retardation amount, the retardation at the time of observing the positive A plate by a 0° observation pole angle is shown. Moreover, each retardation amount is the value at 589 nm, which is calculated by the computer simulation. The azimuth is the angle in a plane parallel to the polarizing plates 8a, 8b, and the observation pole angle α is an inclination angle from the vertical line of the polarizing plates 8a, 8b.

TABLE 1

|  | Red (650 nm) | | Green (550 nm) | | Blue (450 nm) | |
| --- | --- | --- | --- | --- | --- | --- |
|  | Retardation (nm) | Thickness (μm) | Retardation (nm) | Thickness (μm) | Retardation (nm) | Thickness (μm) |
| Negative C Plate | 67.6 | 2.3 | 86.0 | 2.4 | 123.4 | 2.6 |
| Positive A Plate | 118.2 | — | 100.0 | — | 82.4 | — |

From the table 1, the retardation amount at the first retardation layer (negative C plate) is blue>green>red, and the retardation amount at the second retardation layer (positive A plate) is red>green>blue.

At the time, in the first retardation layer (negative C plate), the retardation amount required at a portion corresponding to the red color at the time of observing at the 60° observation pole angle is 67.6 nm, it is 86.0 nm as to the green color and it is 123.4 nm as to the blue color. In order to realize the retardation amounts for each color, with the premise that the thickness on the red light transmissive pattern 2R is d1, the thickness on the green light transmissive pattern 2G is d2 and the thickness on the blue light transmissive pattern 2B is d3, their thicknesses are in the order of d3>d2>d1.

Accordingly, since the required retardation amounts defer depending on the color, it is preferable that the thickness of the first retardation layer differs depending on the color as well. According to the present invention, as mentioned above, since the thicknesses of the light transmissive patterns of each color of the coloring layer differ, the thickness of the first retardation layer formed on the coloring layer can be changed according to the color of the coloring layer to be the base. Thus, for example d3>d2>d1 can be satisfied so that the optimum retardation amount can be realized for each color.

Figure 4:
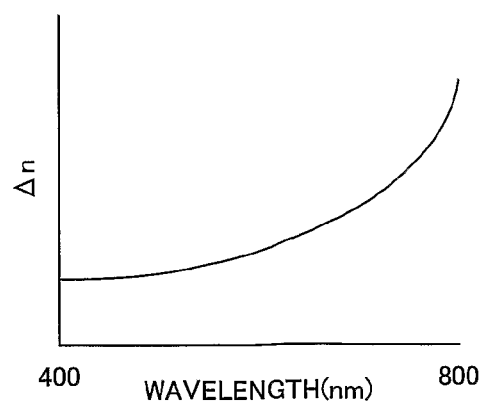
FIG. 4 is an explanatory graph for explaining the inverse dispersion characteristics.

Moreover, for example as shown in FIG. 4, the second retardation layer in the present invention has the refractive index anisotropy in the visible light range (the difference between the refractive index in the optical axis direction and the refractive index in the direction orthogonal to the optical axis direction) Δn smaller with a smaller wavelength so that it has the so-called inverse dispersion characteristics.

Here, in consideration to the retardation amount shown in the table 1, since the thickness d of the second retardation layer (positive A plate) is constant, it is preferable that Δn(R)× d=118.2 nm, Δn(G)×d=100.0 nm, and Δn(B)×d=82.4 nm. Therefore, it is preferable that Δn(R)=118.2 nm/d, Δn(G)=100.0 nm/d, Δn(B)=82.4 nm/d. That is, it is preferable that refractive index anisotropy is large in the order of Δn(R)>Δn(G)>Δn(B).

Since the second retardation layer in the present invention has the refractive index anisotropy in the visible light range which becomes smaller with a shorter wavelength as mentioned above, the optimum retardation amount can be realized for each color by satisfying Δn(R)>Δn(G)>Δn(B).

According to the present invention, since the first retardation layer and the second retardation layer capable of obtaining the retardation amount suitable for each color are used in a combination, even in the case the visual angle is increased in the black display state, generation of the light leakage such as to be observed as a purple color, or the like can be prevented.

According to the present invention, in order to have the upper side of the first retardation layer 3 as a plane for having the thickness of the first retardation layer 3 differ according to the color of the light transmissive patterns 2R, 2G, 2B of each color of the coloring layer 2 to be the base, it is preferable to set the total of the thickness of the coloring layer 2 and the thickness of the first retardation layer 3 as a constant value S so as to satisfy the relationship of D1+d1=D2+d2=D3+d3=S. That is, according to the present invention, it is preferable that the total of the thickness of the coloring layer 2 and the thickness of the first retardation layer 3 is constant, and the thicknesses d1, d2 and d3 of the first retardation layer 3 differ according to the thicknesses D1, D2 and D3 of the light transmissive patterns 2R, 2G and 2B respectively of each color of the coloring layer.

However, in reality, the thicknesses of the light transmissive patterns 2R, 2G, 2B of each color comprising the coloring layer 2 and the first retardation layer 3 may generate the dispersion with respect to the numerical values calculated from the relationship mentioned above due to the coating conditions at the time of forming each layer, the evaporation of the solvent, the contraction at the time of hardening, or the like. Moreover, in the case the first retardation layer 3 is formed by coating the first retardation layer forming coating solution to the surface of the coloring layer 2 with the irregularity, the influence of the irregularity of the coloring layer 2 to be the base may remain on the surface of the formed first retardation layer 3. As a result, the thickness tends to be thinner at a portion where the first retardation layer 3 should be formed thickly. In consideration to these points and to realize the retardation amounts different for each wavelength, it is preferable that the thicknesses d1, d2, d3 of the first retardation layer 3 on the light transmissive patterns 2R, 2G, 2B for each color are about ±20% or less with respect to the theoretical values, and they are more preferably about ±15% or less.

Moreover, based on the generation of the difference from the theoretical value of the thickness of the first retardation layer formed on the entire surface of the coloring layer by coating the first retardation layer forming coating solution on the light transmissive patterns for each color of the coloring layer, for example, it is possible that the corresponding light transmissive pattern is formed thinly at a portion to be thinner according to the irregularity of the coloring layer to be the base so that the first retardation layer on the light transmissive pattern can be formed thickly.

According to the present invention, it is preferable that the total of the thickness of the coloring layer and the thickness of the first retardation layer is constant and the thickness of the first retardation layer differs according to the thickness of the light transmissive pattern. Those having the thickness of the first retardation layer are about ±20% or less with respect to the theoretical values, or more preferably about ±15% or less are included in those having "the total of the thickness of the coloring layer and the thickness of the first retardation layer is constant".

Hereinafter, each configuration of such a color filter with a retardation layer will be explained.

1. First Retardation Layer

First, the first retardation layer used in the present invention will be explained. The first retardation layer used in the present invention is formed on the coloring layer, made of a liquid crystalline polymer, having the optical axis perpendicular to a plane of the base material so as to function as a C plate. The first retardation layer formed immediately above the coloring layer to be described later can have the thickness changed according to the thickness of the light transmissive patterns of each color comprising the coloring layer.

The first retardation layer in the present invention functions as a C plate with the optical axis provided perpendicular to the plane of the base material. As the C plate, there is a positive C plate having the positive refractive index anisotropy and a negative C plate having the negative refractive index anisotropy.

For example, in the case the first retardation layer is a negative C plate, according to the present invention, a combination of a negative C plate (first retardation layer) and a positive A plate (second retardation layer) is used. The retardation amount at the time of using such a color filter with a retardation layer to the liquid crystal display as shown in for example FIG. 2 is blue>green>red as to the negative C plate (first retardation layer) as shown in the table 1. Therefore, the thickness required to the negative C plate (first retardation layer) is as shown in the table 1 and FIG. 1, on the blue light transmissive pattern>on the green light transmissive pattern>on the red light transmissive pattern. Therefore, in the case the first retardation layer is a negative C plate, the thicknesses of the light transmissive patterns of each color of the coloring layer are provided red>green>blue. Thereby, the optimum retardation can be provided to the negative C plate (first retardation layer).

Moreover, a color filter with a retardation layer having a combination of a negative C plate (first retardation layer) and a positive A plate (second retardation layer) can be used preferably for a liquid crystal display of for example, the vertical alignment mode.

Figure 5:
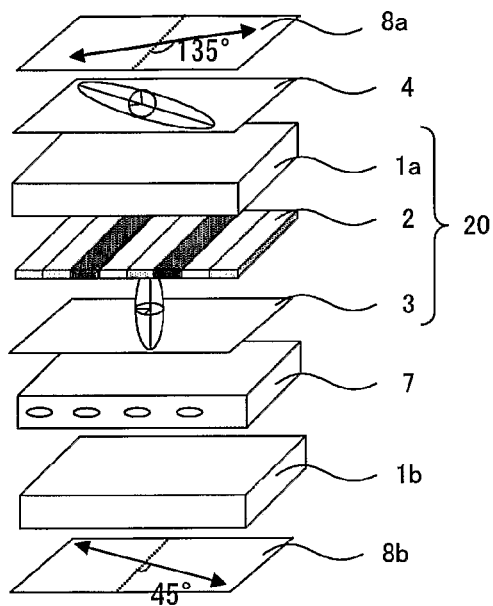
FIG. 5 is a schematic diagram showing another example of a liquid crystal display of the present invention.

On the other hand, in the case the first retardation layer is a positive C plate, according to the present invention, a combination of a positive C plate (first retardation layer) and a positive A plate (second retardation layer) is used. The retardation amount required for the optical compensation in the case of using such a color filter with a retardation layer to the liquid crystal display as shown in for example FIG. 5 is shown in the table 2 below. As mentioned above, as to the positive C plate retardation amount, the retardation amount at the time of observing the positive C plate by a 60° observation pole angle is shown, and as to the positive A plate retardation amount, the retardation at the time of observing the positive A plate by a 0° observation pole angle is shown. Moreover, each retardation amount is the value at 589 nm, which is calculated by the computer simulation.

TABLE 2

|  | Red (650 nm) | | Green (550 nm) | | Blue (450 nm) | |
| --- | --- | --- | --- | --- | --- | --- |
|  | Retardation (nm) | Thickness (μm) | Retardation (nm) | Thickness (μm) | Retardation (nm) | Thickness (μm) |
| Positive C Plate | 67.3 | 1.9 | 57.0 | 1.6 | 46.6 | 1.1 |
| Positive A Plate | 118.2 | — | 100.0 | — | 82.4 | — |

Figure 6:
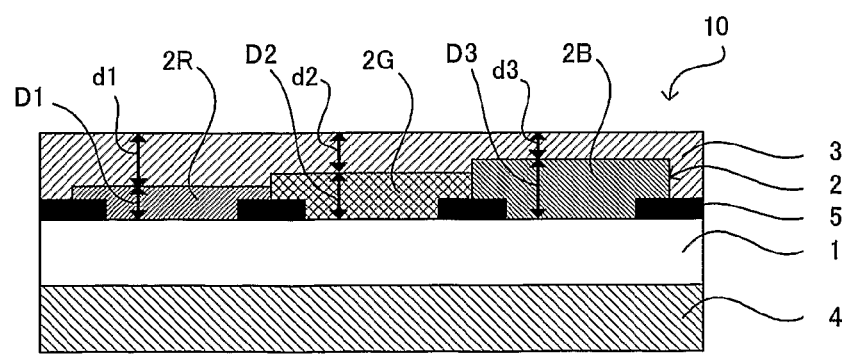
FIG. 6 is a schematic cross-sectional view showing another example of a color filter with a retardation layer of the present invention.

As shown in the table 2, since the retardation amount for the positive C plate (first retardation layer) is red>green>blue, the required thickness is as shown in the table 2 and FIG. 6, on the red light transmissive pattern>on the green light transmissive pattern>on the blue light transmissive pattern. Therefore, in the case the first retardation layer is a positive C plate, the thicknesses of the light transmissive patterns of each color of the coloring layer is provided blue>green>red. Thereby, the optimum retardation can be provided to the positive C plate (first retardation layer).

Moreover, a color filter with a retardation layer as a combination of a positive C plate (first retardation layer) and a positive A plate (second retardation layer) can be used preferably for a liquid crystal display of for example the IPS (In Plane Switching) mode.

Moreover, the first retardation layer in the present invention is made of a liquid crystalline polymer.

Here, the liquid crystalline polymer means one having the liquid crystal state fixed at a room temperature. For example, it means one prepared by polymerizing a liquid crystalline monomer having a polymerizable group in a molecule structure so as to be hardened while maintaining the optical anisotropy before the polymerization, or a polymer type liquid crystal having a glass transition temperature and showing a liquid crystal phase when heated to a temperature of or higher than the glass transition temperature, and having the liquid crystal organization frozen by being cooled down to the glass transition temperature or lower.

The liquid crystalline polymer used in the present invention is not particularly limited as long as it can form a first retardation layer to function as a C plate having the optical axis perpendicular to the plane of the base material. Specifically, a photo polymerizable liquid crystal composition prepared by including a photo polymerization initiating agent and a polymerizable chiral agent to a polymerizable liquid crystal monomer can be used. As such a photo polymerizable liquid crystal composition, the photo polymerizable liquid crystal compositions having a polymerizable liquid crystalline monomer and a chiral agent as disclosed in for example JP-A No. 7-258638 and Japanese Patent Application National Publication (Laid-Open) No. 10-508882 can be presented.

As the polymerizable liquid crystalline monomer, specifically, the compounds represented by the below-mentioned formulae (1) to (11) can be presented.

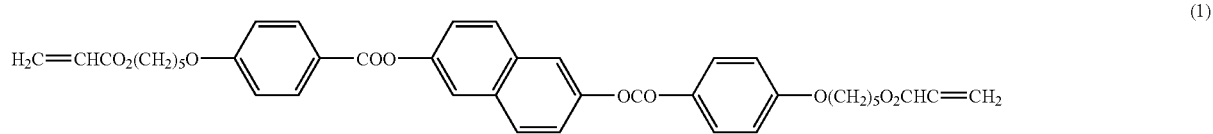

(1)

(2)

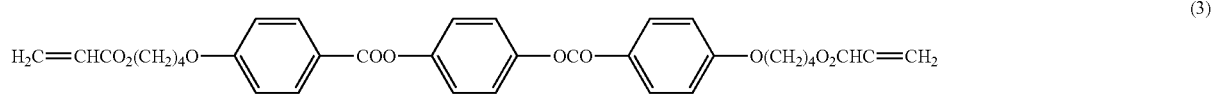

(3)

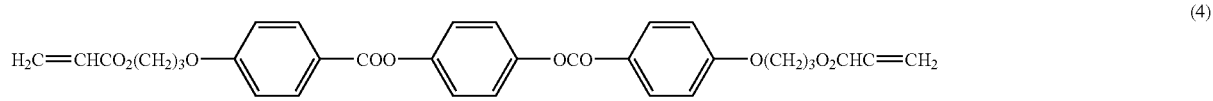

(4)

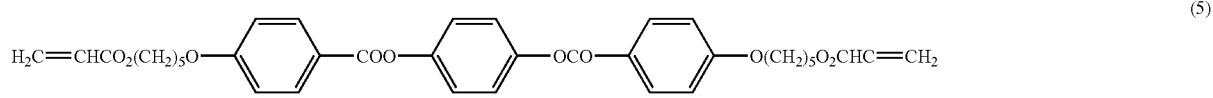

(5)

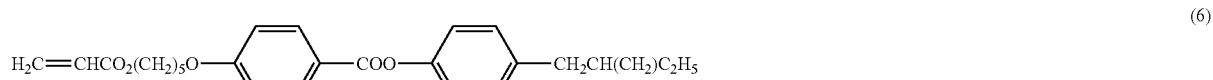

(6)

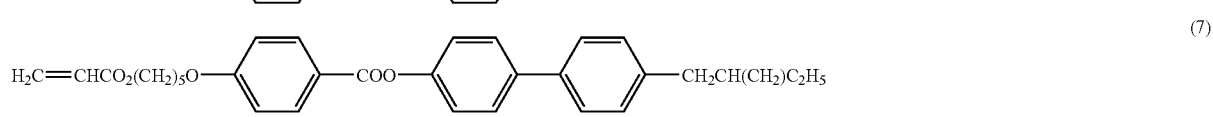

(7)

-continued

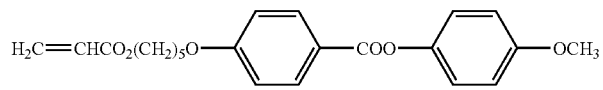
(8)

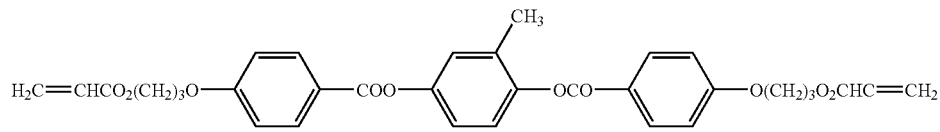
(9)

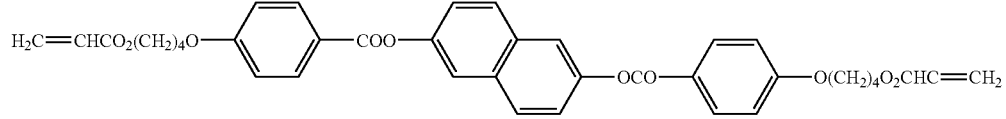
(10)

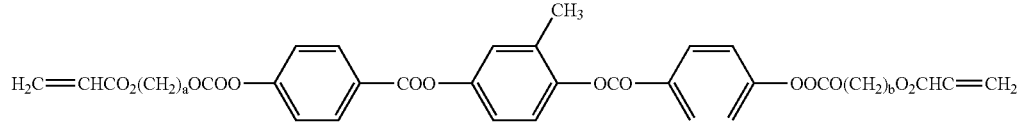
(11)

a and b showing the number of methylene groups (chain length of the alkylene group) in the formula (11) are preferably an integer of each independently 2 to 5. The above-mentioned compounds may be used alone or as a mixture of two or more kinds.

Moreover, as the polymerizable chiral agent, specifically, the compounds represented by the below-mentioned formulae (12) to (14) can be presented.

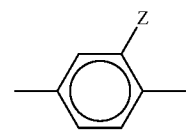
(i)

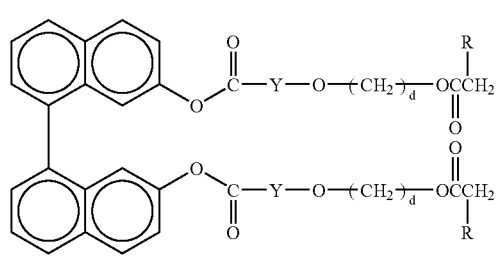
(12)

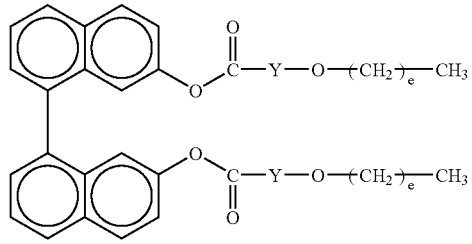
(13)

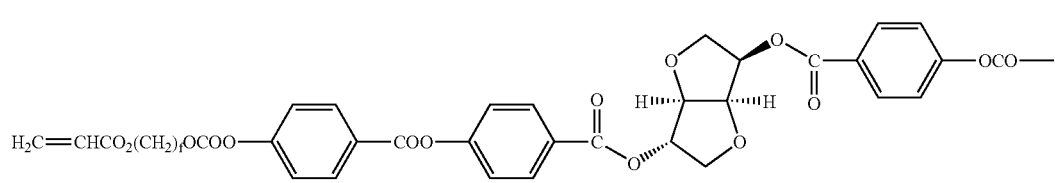
(14)

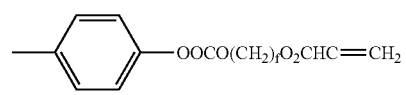

d, e and f showing the number of methylene groups (chain length of the alkylene group) in the formulae (12) to (14) are an integer respectively. d and e are each 2 to 12, more preferably 4 to 10, and particularly preferably 6 to 9. Furthermore, f is 2 to 5. Moreover, Y in the formulae (12) and (13) is any of the below-mentioned formulae (i) to (xxiv), and it is more preferably any of the formulae (i), (ii), (iii), (v) or (vii).

-continued

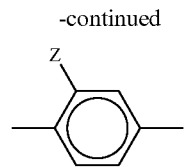
(ii)

-continued

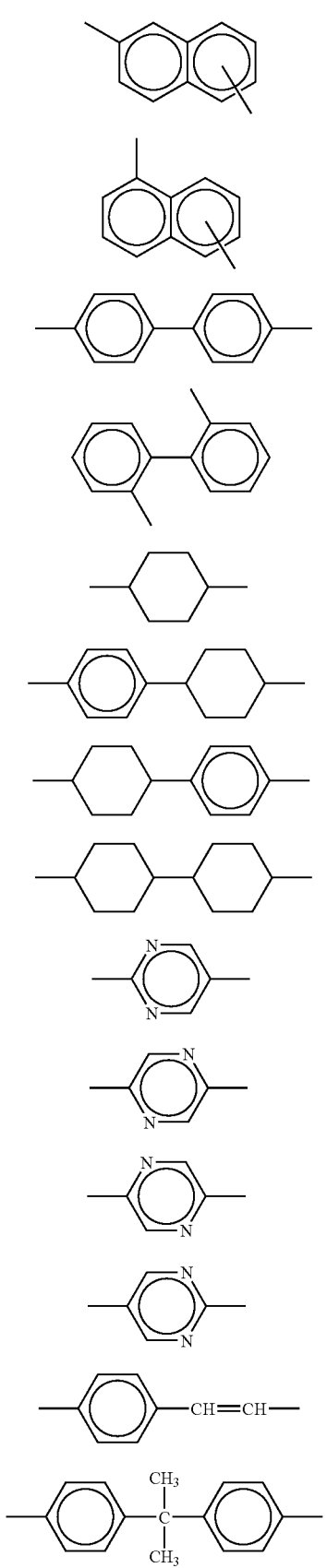

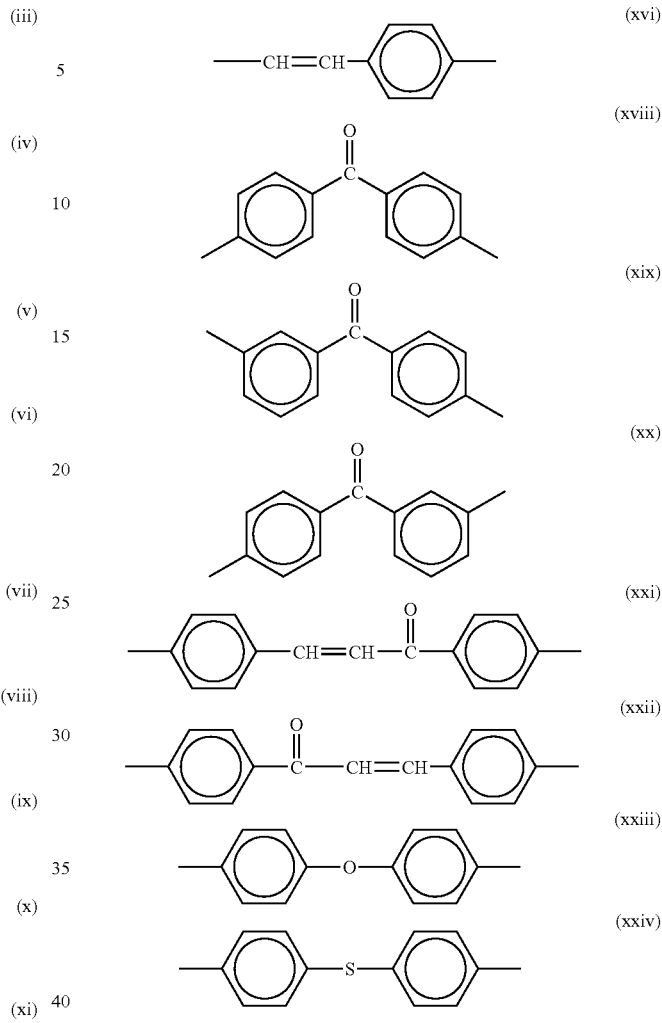

In the present invention, the first retardation layer can be formed immediately above the coloring layer by coating a first retardation layer forming coating solution having a photo polymerizable liquid crystal compound including the liquid crystalline monomer and a polymerizable chiral agent on the coloring layer, and polymerizing the liquid crystalline monomer, the polymerizable chiral agent, or the like by the ultraviolet ray irradiation. At the time, the photo polymerizable liquid crystal compound maybe used as needed after dissolving or diluting with a solvent.

The method for coating the photo polymerizable liquid crystal composition is not particularly limited as long as it is a method capable of coating evenly. For example, spin coating, die coating, slit coating, or the like can be presented. Alternatively these methods can be used in a combination.

Moreover, at the time of forming the first retardation layer on the coloring layer, as a result of the thickness difference of the coloring layer to be the base according to the light transmissive patterns of each color so as to have the irregular state, the photo polymerizable liquid crystal composition coated on the coloring layer cannot always be a plane so that the irregularity of the coloring layer as the base may appear on the upper surface of the coated photo polymerizable liquid crystal composition. Therefore, it is more preferable to forcibly flatten the upper surface of the photo polymerizable liquid crystal composition as needed by covering the coating surface of the photo polymerizable liquid crystal composition with a film or a glass plate for utilizing the surface of the film or the glass plate.

Since the first retardation layer may be formed on the light transmissive patterns of each color comprising the coloring layer, by irradiating in the pattern form at the time of the ultraviolet ray irradiation, only the necessary portions can be remained, and it can be laminated only in the effective display area having the coloring layer, the black matrix, or the like while leaving the circumferential rim part of the base material. Thereby, the first retardation layer can be formed with a thick thickness so that the risk of failing to have a constant cell gap at the time of producing the liquid crystal display using the color filter with a retardation layer of the present invention can be avoided.

Furthermore, it is preferable that the first retardation layer is formed excluding the portions expected to be sealed or laminated with a conductive material on the base material at the time of producing the liquid crystal display using a color filter with a retardation layer of the present invention. With the presence of the first retardation layer, in consideration to the sealing agent and the conductive agent for the upper and lower substrates, the sealing reliability may be lowered. Moreover, also in the case of providing the electric contact with the counter substrate or the electric contact with the TAB (tape auto bonding), secure contact can be rather enabled without the soft first retardation layer for the base.

At the time, the first retardation layer formed on the end face portion on the base material may be removed by a common method such as edge rinse.

The thickness of the first retardation layer differs according to the color of each light transmissive pattern of the coloring layer to be described later. Specifically, it can be set in a range of 0.5 to 5.0 μm.

2. Coloring Layer

Next, the coloring layer used in the present invention will be explained. The coloring layer in the present invention is formed on the base material, with light transmissive patterns having different thicknesses according to the color arranged in a plurality of rows.

The coloring layer in the present invention is not particularly limited as long as it has light transmissive patterns having different thicknesses according to the color arranged in a plurality of rows. It comprises preferably three color light transmissive patterns of red, green and blue. At the time, the thicknesses of the three color light transmissive patterns may either be in the order of blue>green>red or in the order of red>green>blue.

In the case the first retardation layer is a positive C plate, for example from the table 2, the thicknesses of the light transmissive patterns of each color are preferably blue>green>red.

On the other hand, in the case the first retardation layer is a negative C plate, since the retardation amount necessary for the optical compensation differs depending on the liquid crystal layer to be combined and the wavelength dispersion characteristics of the negative C plate itself, the thicknesses of the light transmissive patterns of each color can be selected optionally according to the liquid crystal layer and the wavelength dispersion characteristics of the C plate itself. Therefore, as to the thicknesses of the light transmissive patterns of each color, both the case that red>green>blue is preferable and the case that blue>green>red is preferable can be conceivable. In general, from the table 1, it is preferably red>green>blue.

In the present invention, as a method for controlling the thicknesses so as to have the thicknesses of the light transmissive patterns of each color comprising the coloring layer, a method of controlling the coating thickness at the time of coating the coloring layer forming coating solution for forming the light transmissive patterns of each color can be used. In the present invention, accordingly by coating a constant amount of the first retardation layer forming coating solution on the entire surface of the light transmissive patterns of each color with the thickness controlled and carrying out predetermined exposure, the thickness of the first retardation layer can be controlled according to the thicknesses of the light transmissive patterns of each color of the coloring layer to be the base. Therefore, it is advantageous in that the first retardation layer needs not be formed independently for different thicknesses according to the light transmissive patterns of each color.

Moreover, although the thicknesses of the light transmissive patterns of each color constituting the coloring layer and the thickness of the first retardation layer need to have a predetermined value, a special step is not increased in addition to the steps of forming each layer. Furthermore, since the first retardation layer can be formed as a thin layer of about several μm or less, a thin shape can be enabled by the liquid crystal display using a color filter with a retardation layer of the present invention compared with the case of using the conventional retardation plate.

Such light transmissive patterns of each color of the coloring layer may be provided for each opening part of the black matrix. In terms of the convenience, it may be provided like a band from the front side to back side direction in FIG. 1.

The coloring layer used in the present invention may be formed by preparing an ink composition colored to a predetermined color as a coloring layer forming coating solution and printing the same for each color light transmissive pattern, or it may be formed by a photolithography method using a paint type photosensitive resin composition containing a coloring agent of a predetermined color as a coloring layer forming coating solution. In particular, it is preferable to form the coloring layer by the photolithography method using the photosensitive resin composition.

Although the thicknesses of the light transmissive patterns of each color are not intentionally provided differently in the general coloring layer, according to the present invention, the thicknesses of the light transmissive patterns of each color of the coloring layer to be the base need to be changed according to the color in order to change the thickness of the first retardation layer. At the time of changing the thicknesses of the light transmissive patterns of each color, in the case of making it thicker than usual, the composition amount ratio of the coloring agent in the photosensitive resin composition to be used may be reduced. Moreover, in the case of making it thinner than usual, the composition amount ratio of the coloring agent may be increased. Moreover, in order to control the coating thickness at the time of coating while using such a photosensitive resin composition, in the case of using the coating method or the silk screen printing method capable of changing the coating amount, the coating condition or the printing condition therein is changed, or in the case the coating thickness is changed by the viscosity of the photosensitive resin composition to be used, it is preferable to optionally select the viscosity of the photosensitive resin composition.

Although the thickness of such a coloring layer differs according to the color of the light transmissive pattern of each color, specifically it can be set in a range of 1 to 5 μm.

3. Second Retardation Layer

Next, the second retardation layer used in the present invention will be explained. The second retardation layer used in the present invention is formed on the side opposite to the side with the coloring layer of the base material formed, or between the base material and the coloring layer, having the optical axis parallel to the plane of the base material so as to function as a positive A plate having the positive refractive index anisotropy. Moreover, the second retardation layer has the refractive index anisotropy in the visible light range which becomes smaller with a shorter wavelength.

The second retardation layer in the present invention is not particularly limited as long as it has the so-called inverse dispersion characteristics with the refractive index anisotropy in the visible light range becomes smaller with a shorter wavelength, as shown in, for example in FIG. 4, so as to function as a positive A plate. As such a second retardation layer, specifically, PURE ACE WR (produced by TEIJIN LIMITED), or the like can be presented.

Moreover, as to the position for forming the second retardation layer, it may be the side opposite to the side having the coloring layer formed of the base material, or it may be between the base material and the coloring layer. At the time, the second retardation layer may be attached on the base material via an adhesive layer.

The thickness of the second retardation layer can be about 10 to 100 µm.

4. Base Material

The base material used in the present invention is not particularly limited as long as the coloring layer, first retardation layer and second retardation layer, or the like can be supported, and it is preferably optically isotropic. As such a base material, inorganic base materials such as a glass, a silicon and a quartz, or organic base materials shown below can be used. As the organic base materials, for example, acrylics such as a polymethyl methacrylate, a polyamide, a polyacetal, a polybutylene terephthalate, a polyethylene terephthalate, a polyethylene naphthalate, a triacetyl cellulose, a syndiotactic polystyrene, or the like, a polyphenyl sulfide, a polyether ketone, a polyether ether ketone, a fluorine resin, a polyether nitrile, or the like, a polycarbonate, a modified polyphenylene ether, a polycyclohexane, a polynorbornene based resin, or the like, or a polyether sulfone, a polysulfone, a polypropylene, a polyalylate, a polyamide imide, a polyether imide, a polyimide, or the like can be presented. Moreover, as the organic base materials, commonly used plastics can also be used.

The thickness of the base material is not particularly limited, and according to the application, those of for example about 5 µm to 1 mm can be used.

5. Alignment Layer

In the present invention, an alignment layer may be formed between the coloring layer and first retardation layer. The alignment layer is for aligning the liquid crystalline polymer used in the first retardation layer in a predetermined direction.

The alignment layer is not particularly limited as long as it has the alignment function of aligning the liquid crystalline polymer. For example, a photo alignment layer, a rubbing alignment layer, or the like can be presented.

6. Black Matrix

In the present invention, for example as shown in FIG. 1, a black matrix 5 may be formed at a position corresponding to the non pixel part on the base material 1.

As the black matrix, a resin containing a black coloring agent can be used. Such a black matrix can be formed by using a photo resist after coating a paint type resin composition containing a black coloring agent onto the entire surface of the base material so as to be temporarily solidified, or by coating with a paint type photosensitive resin composition containing a black coloring agent for an exposure and developing.

Moreover, as the black matrix, a two layer chromium black matrix comprising a laminated structure of $CrO_x/Cr$ (x is an optional number, and "/" represents the lamination), a three layer chromium black matrix comprising a laminated structure of $CrO_x/CrN_y/Cr$ (x, y are each optional number) with the reflection ratio further reduced, or the like can be used. Such a black matrix can be formed by a method of forming a thin film of a metal, a metal oxide, a metal nitride, or the like by various methods such as deposition, ion plating, sputtering, or the like, and patterning by the photolithography method, an electroless plating method, a printing method using a black ink composition, or the like.

The thickness of the black matrix is about 0.2 to 0.4 µm in the case of forming as a thin film, and it is about 0.5 to 2 µm in the case of forming by the printing method.

7. Electrode Layer

In the present invention, an electrode layer may be formed on the first retardation layer. The electrode layer is for driving the liquid crystal by applying a signal voltage to the liquid crystal constituting the liquid crystal layer in the liquid crystal display at the time of providing a liquid crystal display using a color filter with a retardation layer of the present invention.

As the electrode layer, those commonly used as an electrode layer of a liquid crystal display can be used. For example, a transparent electrode of an indium oxide, a tin oxide, an indium tin oxide (ITO), or the like can be presented.

The above-mentioned electrode layer can be formed by the deposition method such as the CVD method, the sputtering method and the ion plating method.

Moreover, according to the present invention, a transparent protection layer may be provided between the electrode layer and the first retardation layer. The transparent protection layer is a layer provided for protecting the first retardation layer at the time of forming the electrode layer.

8. Application

The color filter with a retardation layer of the present invention can be used preferably for a liquid crystal display, in particular, for a liquid crystal display capable of providing the color display.

B. Liquid Crystal Display

Next, the liquid crystal display of the present invention will be explained.

The liquid crystal display of the present invention comprises a first polarizing plate and a second polarizing plate with the absorption axes provided orthogonal with each other, between the first polarizing plate and the second polarizing plate are provided a color filter comprising a base material, a coloring layer formed on the base material, with light transmissive patterns having different thicknesses according to each color formed in a plurality of rows, a first retardation layer formed on the coloring layer, made of a liquid crystalline polymer, having the optical axis perpendicular to the plane of the base material so as to function as a C plate, a second retardation layer, having the optical axis parallel to the plane of the base material so as to function as a positive A plate having the positive refractive index anisotropy, and a liquid crystal layer, characterized in that the first polarizing plate, the second retardation layer, the first retardation layer and the second polarizing plate are formed in this order such that the optical axis of the second retardation layer and the absorption axis of the first polarizing plate are disposed substantially perpendicularly, and the refractive index anisotropy of the second retardation layer in the visible light range becomes smaller with a shorter wavelength.

The liquid crystal display of the present invention will be explained with reference to the drawings.

FIG. 2 is a schematic diagram showing an example of the liquid crystal display of the present invention. The liquid crystal display shown in FIG. 2 has the observation side on the upper side of the figure. From the observation side it has a first polarizing plate 8a, a second retardation layer 4, a color filter 20 comprising a base material 1a, a coloring layer 2 and a first retardation layer 3, a liquid crystal layer 7, a counter base material 1b, and a second polarizing plate 8a laminated successively, and it is a transmission type liquid crystal display element to be visualized by the illumination from the opposite side of the observation side, that is, the rear side. FIG. 2 is for showing the relative positional relationship of each layer so that the layers are not separated as shown in the figure.

According to the present invention, as it is mentioned in the item of "A. Color filter with a retardation layer", since the thicknesses of the light transmissive patterns of each color of the coloring layer differ according to the color, the optimum retardation can be provided to the first retardation layer formed on the coloring layer. Moreover, since the second retardation layer has the so-called inverse dispersion characteristics, the optimum retardation can be provided also to the second retardation layer. Thereby, even in the case the liquid crystal display is observed obliquely, generation of the light leakage such as to be observed as a purple color, or the like of the black display screen can be prevented.

Moreover, since the liquid crystal display shown in for example FIG. 2 is a transmission type liquid crystal display element with the light transmissible to the entirety, it is illuminated form the rear side so that the upper side in the figure is the observation side. According to such a liquid crystal display, since the first retardation layer and the second retardation layer are provided, the visual angle can be provided widely, that is, the visible angle range can be wide.

Furthermore, according to the present invention, the optical axis of the second retardation layer 4 and the absorption axis of the first polarizing plate 8a are disposed substantially perpendicularly because such an arrangement is preferable for the optical compensation of the liquid crystal display.

The "substantially perpendicular" here denotes that the angle formed by the optical axis of the second retardation layer and the absorption axis of the first polarizing plate is in a range of 90°±2°. The angle is preferably in a range of 90°±1°.

Furthermore, the absorption axis of the first polarizing plate 8a on the observation side is in the 135° counterclockwise direction from the front side to the back side of the figure, and the absorption axis of the rear side second polarizing plate 8b is in the 45° counterclockwise direction from the front side to the back side of the figure so that the absorption axes of the first polarizing plate 8a and the second polarizing plate are orthogonal with each other. Thereby, the incident light beam can be a linear polarized light beam so that the light beam can be transmitted only in the portion with the liquid crystal layer 7 driven.

The configuration of the liquid crystal display of the present invention is not particularly limited as long as for example as shown in FIGS. 2 and 5, a color filter 20, a second retardation layer 4 and a liquid crystal layer 7 are formed between the first polarizing plate 8a and the second polarizing plate 8b, and the first polarizing plate 8a, the second retardation layer 4, the first retardation layer 3 and the second polarizing plate 8b are formed in this order. In many cases, this can be classified into two embodiments depending on whether the first retardation layer functions as a positive C plate having the positive refractive index anisotropy, or as a negative C plate having the negative refractive index anisotropy. Hereinafter, it will be explained for the case with the first retardation layer functioning as a negative C plate (first embodiment) and the case with the first retardation layer functioning as a positive C plate (second embodiment).

1. FIRST EMBODIMENT

In the present invention, in the case the first retardation layer functions as a negative C plate, a liquid crystal display comprising a combination of the first retardation layer (negative C plate) and the second retardation layer (positive A plate) is provided. Thereby, the visual angle can be improved so that the optimum retardation amount can be obtained. Such a liquid crystal display of this embodiment is preferable as a liquid crystal display of for example the vertical alignment mode.

In the case the liquid crystal display of this embodiment is for example of the vertical alignment mode, the liquid crystal layer in the liquid crystal display functions as a positive C plate. Since the retardation amount of the liquid crystal layer tends to be larger than the retardation amount necessary for a positive C plate for the purpose of the optical compensation, in order to obtain a targeted retardation amount, it is preferable that the first retardation layer functions as a negative C plate. Thereby, the excessive retardation amount of the liquid crystal layer (positive C plate) can be offset to balance out by the first retardation layer (negative C plate) so that the optical design to have the optimum retardation amount can be enabled.

Moreover, at the time, it is preferable that the optical axis of the liquid crystal layer and the optical axis of the first retardation layer are substantially same. This is because for the optical design to have the targeted retardation amount, the optical axis of the liquid crystal layer and the optical axis of the first retardation layer need to be substantially same.

The "substantially same" denotes that the angle formed by the optical axis of the liquid crystal layer and the optical axis of the first retardation layer is in a range of 0°±2°. The angle is preferably in a range of 0°±1°.

Moreover, the liquid crystal display of this embodiment can be classified into two aspects according to the liquid crystal layer forming position. According to the first aspect of the liquid crystal display of this embodiment, the liquid crystal layer is formed between the color filter and the second polarizing plate, and the second retardation layer is formed on the side opposite to the side of the base material of the color filter with the coloring layer formed, or between the base material of the color filter and the coloring layer. Moreover, according to the second aspect of the liquid crystal display of this embodiment, the liquid crystal layer is formed between the second retardation layer and the color filter. Hereinafter, each aspect will be explained.

(1) First Aspect

According to the first aspect of the liquid crystal display of this embodiment, the liquid crystal layer is formed between the color filter and the second polarizing plate, and the second retardation layer is formed on the side opposite to the side of the base material of the color filter with the coloring layer formed, or between the base material of the color filter and the coloring layer. According to the liquid crystal display of this aspect, for example as shown in FIG. 2, the second retardation layer 4 is formed on the base material 1a of the color filter 20 and the liquid crystal layer 7 is formed between the color filter 20 and the second polarizing plate 8b such that the first polarizing plate 8a, the second retardation layer 4, the color filter 20 having the base material 1a, the coloring layer 2 and the first retardation layer 3, the liquid crystal layer 7, the counter base material 1b and the second polarizing plate 8a are laminated in this order.

Hereinafter, each configuration of such a liquid crystal display will be explained.

(i) Color Filter

The color filter used in this aspect comprises a base material, a coloring layer formed on the base material, with light transmissive patterns having different thicknesses according to each color formed in a plurality of rows, and a first retardation layer formed on the coloring layer, made of a liquid crystalline polymer, having the optical axis perpendicular to the plane of the base material so as to function as a C plate. Moreover, the color filter is formed between the first polarizing plate and the liquid crystal layer.

Since the base material, the coloring layer and the first retardation layer of the color filter are same as the base material, the coloring layer and the first retardation layer mentioned in the column of "A. Color filter with a retardation layer", explanation is omitted here.

(ii) Second Retardation Layer

The second retardation layer used in this aspect has the so-called inverse dispersion characteristics with the refractive index anisotropy in the visual light range becomes smaller with a shorter wavelength.

In order to improve the visual angle characteristics, the second retardation layer needs to be formed inside the first polarizing plate and in the vicinity of the first polarizing plate, however, an optically isotropic member such as a base material of a color filter may be formed between the second retardation layer and the first polarizing plate. Therefore, the second retardation layer forming position may be on the side opposite to the side of the base material of the color filter with the coloring layer formed, that is, between the first polarizing plate and the color filter, or it may be between the base material of the color filter and the coloring layer.

Since the other points of the second retardation layer are same as those of the second retardation layer mentioned in the item of "A. Color filter with a retardation layer", explanation is omitted here.

(iii) First Polarizing Plate and Second Polarizing Plate

In this aspect, the color filter, the second retardation layer and the liquid crystal layer are formed between the first polarizing plate and the second polarizing plate, with the absorption axis of the first polarizing plate and the absorption axis of the second polarizing plate provided orthogonal with each other.

As the first polarizing plate and the second polarizing plate used in the present invention, those commonly used as a polarizing plate of a liquid crystal display can be used. Moreover, the first polarizing plate and the second polarizing plate may be attached on the base material, the second retardation layer, or the like via an adhesive layer, or the like.

(iv) Liquid Crystal Layer

The liquid crystal layer used in this aspect is formed between the color filter and the second polarizing plate. It can be provided by for example filling a gap between the color filter substrate having a color filter and a counter substrate with a liquid crystal.

The liquid crystal constituting the liquid crystal layer is not particularly limited as long as it can be used for a liquid crystal display capable of realizing the optical compensation by combining a negative C plate (first retardation layer) and a positive A plate (second retardation layer). For example, a liquid crystal having the operation mode of the vertical alignment (VA; Vertical Alignment) mode, or the like can be presented.

As the method for forming the liquid crystal layer, a method commonly used as a method for producing a liquid crystal cell can be used. For example, the liquid crystal layer can be formed by heating a liquid crystal so as to be an isotropic liquid, injecting the same to a liquid crystal cell produced using a color filter substrate having a color filter and a counter substrate, utilizing the capillary effect, and sealing with an adhesive. At the time, the thickness of the liquid crystal layer can be adjusted by a spacer such as beads.

(v) Other Members

In this aspect, an electrode layer may be formed on the sides of the first retardation layer of the color filter and the counter base member facing with each other. The electrode layer is for driving the liquid crystal by applying a signal voltage to the liquid crystal constituting the liquid crystal layer. As the electrode layer, those commonly used as an electrode of a liquid crystal display can be used. For example, a transparent electrode of an indium oxide, a tin oxide, an indium tin oxide (ITO), or the like can be presented.

Moreover, according to this aspect, an alignment layer for a liquid crystal layer may be formed on the both sides of the liquid crystal layer. Thereby, the alignment of the liquid crystal constituting the liquid crystal layer can be controlled. The alignment layer is not particularly limited as long as it has the alignment function of aligning the liquid crystal. For example, a photo alignment layer, a rubbing alignment layer, or the like can be presented.

Furthermore, in this aspect, a black matrix may be formed at a position corresponding to the non pixel part on the base material of the color filter. Since the black matrix is same as that of mentioned in the item of "A. Color filter with a retardation layer", explanation is omitted here.

(vi) Production Method for the Liquid Crystal Display

Next, the method for producing the liquid crystal display of this aspect will be explained.

As an example of the production method for the liquid crystal display of this aspect, first, a coloring layer is provided by forming light transmissive patterns of each color having different thicknesses according to the color by coating a photo sensitive resin composition on the base material and controlling the coating thickness, and an alignment layer is formed on the coloring layer. Then, the first retardation layer is formed by coating a photo polymerizable liquid crystal composition including a liquid crystalline polymer on the alignment layer and exposing. Then, by forming an electrode layer by the sputtering method on the first retardation layer and furthermore forming an alignment layer for a liquid crystal layer on the electrode layer, a color filter substrate is provided. On the other hand, an electrode layer and an alignment layer for a liquid crystal layer are formed on the counter base material in the same manner as mentioned above so as to provide a counter substrate. With beads scattered on the alignment layer for a liquid crystal layer of the counter substrate as a spacer, by applying a sealing agent on the circumference, the alignment layer for a liquid crystal layer of the color filter substrate and the alignment layer for a liquid crystal layer of the counter substrate are attached in a state facing with each other and thermally pressed. Then, the liquid crystal is injected from the injection opening in the isotropic liquid state utilizing the capillary effect and the injection opening is sealed with the ultraviolet ray curable resin, or the like. Thereafter, the liquid crystal can be aligned by gradually cooling down. By attaching the second retardation layer having the inverse dispersion characteristics to the color filter substrate side of the liquid crystal cell accordingly obtained, and furthermore, attaching the first polarizing plate and the second polarizing plate to the both sides of the liquid crystal cell, the liquid crystal display of this aspect can be obtained.

(2) Second Aspect

Figure 7:
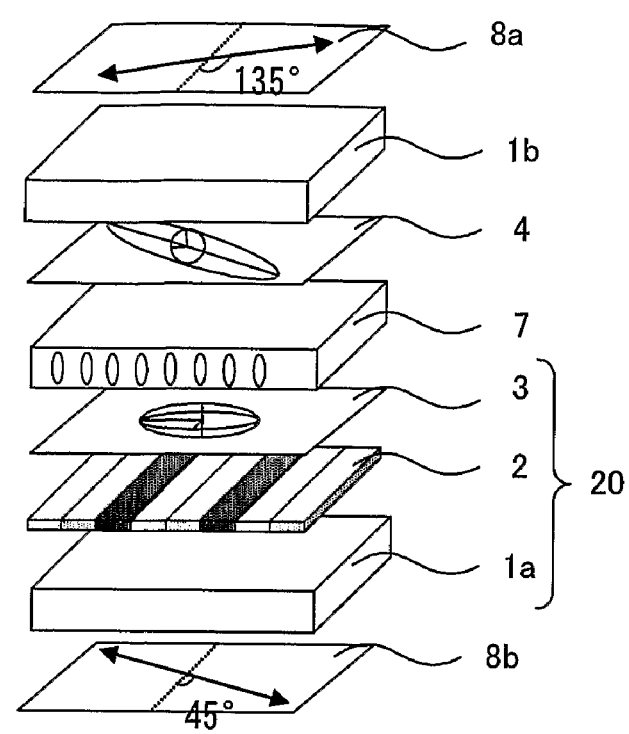
FIG. 7 is a schematic diagram showing still another example of a liquid crystal display of the present invention.

According to the second aspect of the liquid crystal display of this embodiment, the liquid crystal layer is formed between the second retardation layer and the color filter. According to the liquid crystal display of this aspect, for example as shown in FIG. 7, the liquid crystal layer 7 is formed between the second retardation layer 4 and the color filter 20 such that the first polarizing plate 8a, the counter base material 1b, the second retardation layer 4, the liquid crystal layer 7, the color filter 20 comprising the first retardation layer 3, the coloring layer 2 and the base material 1a, and the second polarizing plate 8b are laminated in this order. FIG. 7 is for showing the relative positional relationship of each layer so that the layers are not separated as shown in the figure.

Hereinafter, each configuration of such a liquid crystal display will be explained. Since the first polarizing plate, the second polarizing plate, the other members and so on are same as those mentioned in the first aspect, explanation is omitted here.

(i) Color Filter

The color filter used in this aspect comprises a base material, a coloring layer formed on the base material, with light transmissive patterns having different thicknesses according to each color formed in a plurality of rows, and a first retardation layer formed on the coloring layer, made of a liquid crystalline polymer, having the optical axis perpendicular to the plane of the base material so as to function as a C plate. Moreover, the color filter is formed between the liquid crystal layer and the second polarizing plate.

Since the base material, the coloring layer and the first retardation layer of the color filter are same as the base material, the coloring layer and the first retardation layer mentioned in the column of "A. Color filter with a retardation layer", explanation is omitted here.

(ii) Second Retardation Layer

The second retardation layer used in this aspect has the so-called inverse dispersion characteristics with the refractive index anisotropy in the visual light range which becomes smaller with a shorter wavelength.

Since the second retardation layer needs to be formed inside the first polarizing plate and in the vicinity of the first polarizing plate in order to improve the visual angle characteristics, it is formed between the first polarizing plate and the liquid crystal layer. An optically isotropic member may be formed between the second retardation layer and the first polarizing plate.

Since the other points of the second retardation layer are same as those of the second retardation layer mentioned in the item of "A. Color filter with a retardation layer", explanation is omitted here.

(iii) Liquid Crystal Layer

The liquid crystal layer used in this aspect is formed between the second retardation layer and the color filter. It can be provided by for example filling a gap between the color filter substrate having a color filter and a counter substrate with a liquid crystal.

For the liquid crystal constituting the liquid crystal layer, as in the first aspect, a liquid crystal of the vertical alignment mode can be presented.

As the method for forming the liquid crystal layer, a method commonly used as a method for producing a liquid crystal cell can be used. For example, the liquid crystal layer can be formed by heating a liquid crystal so as to be an isotropic liquid, injecting the same to a liquid crystal cell produced using a color filter substrate having a color filter and a counter substrate, utilizing the capillary effect, and sealing with an adhesive. At the time, the thickness of the liquid crystal layer can be adjusted by a spacer such as beads.

(iv) Method for Producing a Liquid Crystal Display

Next, the method for producing the liquid crystal display of this aspect will be explained.

As an example of the production method for the liquid crystal display of this aspect, first, a coloring layer is provided by forming light transmissive patterns of each color having different thicknesses according to the color by coating a photo sensitive resin composition on the base material and controlling the coating thickness, and an alignment layer is formed on the coloring layer. Then, the first retardation layer is formed by coating a photo polymerizable liquid crystal composition including a liquid crystalline polymer on the alignment layer and exposing. Then, by forming an electrode layer by the sputtering method on the first retardation layer and furthermore forming an alignment layer for a liquid crystal layer on the electrode layer, a color filter substrate is provided. On the other hand, an electrode layer and an alignment layer for a liquid crystal layer are formed on the counter base material in the same manner as mentioned above so as to provide a counter substrate. With beads scattered on the alignment layer for a liquid crystal layer of the counter substrate as a spacer, by applying a sealing agent on the circumference, the alignment layer for a liquid crystal layer of the color filter substrate and the alignment layer for a liquid crystal layer of the counter substrate are attached in a state facing with each other and thermally pressed. Then, the liquid crystal is injected from the injection opening in the isotropic liquid state utilizing the capillary effect and the injection opening is sealed with the ultraviolet ray curable resin, or the like. Thereafter, the liquid crystal can be aligned by gradually cooling down. By attaching the second retardation layer having the inverse dispersion characteristics to the counter substrate side of the liquid crystal cell accordingly obtained, and furthermore, attaching the first polarizing plate and the second polarizing plate to the both sides of the liquid crystal cell, the liquid crystal display of this aspect can be obtained.

2. SECOND EMBODIMENT

In the present invention, in the case the first retardation layer functions as a positive C plate, a liquid crystal display comprising a combination of the first retardation layer (positive C plate) and the second retardation layer (positive A plate) is provided. Thereby, the visual angle can be improved so that the optimum retardation amount can be obtained. Such a liquid crystal display of this embodiment is preferable as a liquid crystal display of the IPS (In Plane Switching) mode. Moreover, it can be used commonly for a liquid crystal display with two polarizing plates disposed in the crossed Nicol state.

In the case the liquid crystal display of this embodiment is of the IPS mode, since the refractive index anisotropy of the liquid crystal constituting the liquid crystal layer does not influence the retardation amount necessary for the optical compensation, the retardation amount of the liquid crystal layer needs not be considered for obtaining the targeted retardation amount. Therefore, in the case the first retardation layer functions as a positive C plate, the optical design can be provided for having the optimum retardation amount only in consideration to the retardation amount of the first retardation layer (positive C plate) and the second retardation layer (positive A plate).

According to the liquid crystal display of this embodiment, the liquid crystal layer is formed between the color filter and the second polarizing plate, and the second retardation layer is formed on the side opposite to the side of the base material of the color filter with the coloring layer formed, or between the base material of the color filter and the coloring layer. According to the liquid crystal display of this aspect, for example as shown in FIG. 5, the second retardation layer 4 is formed on the base material 1a of the color filter 20 and the liquid crystal layer 7 is formed between the color filter 20 and the second polarizing plate 8b such that the first polarizing plate 8a, the second retardation layer 4, the color filter 20 having the base material 1a, the coloring layer 2 and the first retardation layer 3, the liquid crystal layer 7, the counter base material 1b and the second polarizing plate 8b are laminated in this order. FIG. 5 is for showing the relative positional relationship of each layer so that the layers are not separated as shown in the figure.

Hereinafter, each configuration of such a liquid crystal display will be explained. Since the first polarizing plate, the second polarizing plate, the other members, the method for producing the liquid crystal display, or the like, are same as those mentioned in the first aspect of the first embodiment, and furthermore, the second retardation layer is same as that mentioned in the first aspect of the first embodiment and the column of "A. Color filter with a retardation layer", explanation is omitted here.

(i) Color Filter

The color filter used in this embodiment comprises a base material, a coloring layer formed on the base material, with light transmissive patterns having different thicknesses according to each color formed in a plurality of rows, and a first retardation layer formed on the coloring layer, made of a liquid crystalline polymer, having the optical axis perpendicular to the plane of the base material so as to function as a C plate. Moreover, the color filter is formed between the first polarizing plate and the liquid crystal layer.

Since the base material, the coloring layer and the first retardation layer of the color filter are same as the base material, the coloring layer and the first retardation layer mentioned in the column of "A. Color filter with a retardation layer", explanation is omitted here.

(ii) Liquid Crystal Layer

The liquid crystal layer used in this embodiment is formed between the color filter and the second polarizing plate. It can be provided by for example filling a gap between the color filter substrate having a color filter and a counter substrate with a liquid crystal.

The liquid crystal constituting the liquid crystal layer is not particularly limited as long as it can be used for a liquid crystal display capable of realizing the optical compensation by combining a positive C plate (first retardation layer) and a positive A plate (second retardation layer). For example, a liquid crystal having the operation mode of the IPS mode, or the like can be presented.

Since the method for forming the liquid crystal layer is same as that mentioned in the first aspect of the first embodiment, explanation is omitted here.

The present invention is not limited to the embodiments. The above-mentioned embodiments are examples so that any one having the substantially same configuration as the technological idea mentioned in the scope of the claims of the present invention so as to achieve the same effects can be included in the technological scope of the present invention.

EXAMPLES

Hereinafter, the present invention will be explained specifically with reference to the examples.

Example 1

Color Filter with a Retardation Layer (Preparation of the Base Material)

As a base material cleaned by applying an appropriate washing process, a glass substrate (1737 material, produced by Corning Inc.) was prepared.

(Preparation of a Coloring Layer Forming Coating Solution)

For the black matrix and light transmissive patterns of each color for red (R), green (G), blue (B), pigment dispersion type photo resists were used. The pigment dispersion type photo resists were prepared with pigments as the coloring agents by adding beads to a dispersion composition (containing a pigment, a dispersing agent and a solvent) so as to be dispersed for 3 hours with a disperser, and thereafter mixing the dispersion composition with the beads removed and a clear resist composition (containing a polymer, a monomer, an additive, an initiating agent and a solvent). The compositions of each pigment dispersion type photo resist used for the black matrix and the light transmissive patterns of each color of red (R), green (G), blue (B) are shown below. As the dispersing machine, a paint shaker was used.

| <Pigment dispersion type photo resist for the black matrix> | |
|---|---|
| Black pigment (produced by Dainichiseika Color & Chemicals Mfg. Co., Ltd., TM black #9550) | 14.0 parts by weight |
| Dispersing agent (produced by BYK-Chemie Japan KK, Disperbyk 111) | 1.2 parts by weight |
| Polymer (produced by SHOWA HIGHPOLYMER CO., LTD. VR60) | 2.8 parts by weight |
| Monomer (produced by Sartomer Company Inc, SR399) | 3.5 parts by weight |
| Additive (produced by Soken Chemical & Engineering Co., Ltd., L-20) | 0.7 part by weight |

| <Pigment dispersion type photo resist for the black matrix> | |
| --- | --- |
| Initiating agent (2-benzyl-2-dimethyl amino-1-(4-morphoryno phenyl)-butanone-1) | 1.6 parts by weight |
| Initiating agent (4,4'-diethyl amino benzophenone) | 0.3 part by weight |
| Initiating agent (2,4-diethyl thioxanthone) | 0.1 part by weight |
| Solvent (ethylene glycol monobutyl ether) | 75.8 parts by weight |

| <Pigment dispersion type photo resist for the red (R) light transmissive pattern> | |
| --- | --- |
| Red pigment (C. I. PR 254 (produced by Chiba Speciality Chemicals, CROMOPHTAL DPP Red BP)) | 3.5 parts by weight |
| Yellow pigment (C. I. PY139 (produced by BASF Japan, Paliotol yellow D1819)) | 0.6 part by weight |
| Dispersing agent (produced by Zeneca, Solsperse 24000) | 3.0 parts by weight |
| Monomer (produced by Sartomer Company Inc, SR399) | 4.0 parts by weight |
| Polymer 1 | 5.0 parts by weight |
| Initiating agent (produced by Ciba-Geigy Japan Limited, IRGACURE 907) | 1.4 parts by weight |
| Initiating agent (2,2'-bis (o-chloro phenyl)-4,5,4',5'-tetraphenyl-1,2'-biimidazol) | 0.6 part by weight |
| Solvent (propylene glycol monomethyl ether acetate) | 80.0 parts by weight |

| <Pigment dispersion type photo resist for the green (G) light transmissive pattern> | |
| --- | --- |
| Green pigment (C. I. PG7 (produced by Dainichiseika Color & Chemicals Mfg. Co., Ltd., SEIKA FAST GREEN 5316P)) | 3.7 parts by weight |
| Yellow pigment (C. I. PY139 (produced by BASF Japan., Paliotol yellow D1819)) | 2.3 part by weight |
| Dispersing agent (produced by Zeneca, Solsperse 24000) | 3.0 parts by weight |
| Monomer (produced by Sartomer Company Inc, SR399) | 4.0 parts by weight |
| Polymer 1 | 5.0 parts by weight |
| Initiating agent (produced by Ciba-Geigy Japan Limited, IRGACURE 907) | 1.4 parts by weight |
| Initiating agent (2,2'-bis (o-chloro phenyl)-4,5,4',5'-tetraphenyl-1,2'-biimidazol) | 0.6 part by weight |
| Solvent (propylene glycol monomethyl ether acetate) | 80.0 parts by weight |

| <Pigment dispersion type photo resist for the blue (B) light transmissible patter> | |
| --- | --- |
| Blue pigment (C. I. PB15:6 (produced by BASF Japan., HELIOGEN BLUE L6700F)) | 4.6 parts by weight |
| Purple pigment (C. I. PV23 (produced by Clariant (Japan) KK, FOSTER PERM RL-NF)) | 1.4 parts by weight |
| Pigment derivative (produced by Zeneca, Solsperse 112000) | 0.6 part by weight |
| Dispersing agent (produced by Zeneca, Solsperse 24000) | 2.4 parts by weight |
| Monomer (produced by Sartomer Company Inc, SR399) | 4.0 parts by weight |
| Polymer 1 | 5.0 parts by weight |
| Initiating agent (produced by Ciba-Geigy Japan Limited, IRGACURE 907) | 1.4 parts by weight |
| Initiating agent (2,2'-bis (o-chloro phenyl)-4,5,4',5'-tetraphenyl-1,2'biimidazol) | 0.6 part by weight |
| Solvent (propylene glycol monomethyl ether acetate) | 80.0 parts by weight |

The above-mentioned polymer 1 was produced by 16.9 mole % of a 2-methacryloyloxy ethyl isocyanate to 100 mole % of a copolymer of benzyl methacrylate:styrene:acrylic acid:2-hydroxy ethyl methacrylate=15.6:37.0:30.5:16.9 (mole ratio), and its weight average molecular weight was 42,500.

(Preparation of the First Retardation Layer Forming Coating Solution)

A photo polymerizable liquid crystal composition for forming a first retardation layer to function as a negative C plate was prepared by mixing 75 parts by weight of a liquid crystal monomer having a polymerizable acrylate group on the both ends and a spacer between a mesogen in the central part and the acrylates, 1 part by weight of IRGACURE Irg814 (produced by Chiba Speciality Chemicals) as the photo polymerization initiating agent, and 25 parts by weight of a toluene as the solvent, and furthermore, adding 5 parts by weight of chiral agent having a polymerizable acrylate group on the both ends.

(Formation of the Coloring Layer)

After washing the glass substrate according to the ordinary method, by coating the pigment dispersion type photo resist for the black matrix onto the glass substrate with a 1.2 μm thickness by the spin coating method, pre-baking by the conditions of 90° C. for 3 minutes, carrying out predetermined pattern exposure (100 mJ/cm$^2$) and spray development using a 0.05% KOH aqueous solution for 60 seconds, and post-baking by the conditions of 200° C. for 30 minutes, a black matrix was formed.

Next, by coating the pigment dispersion type photo resist for the red (R) light transmissive pattern onto the substrate with the black matrix formed by the spin coating method, pre-baking with the conditions of 80° C. for 5 minutes, and carrying out alignment exposure (300 mJ/cm$^2$) using a predetermined photo mask for a coloring pattern and spray development using a 0.1% KOH aqueous solution for 60 seconds, and post-baking with the conditions of 200° C. for 60 minutes, a red (R) light transmissive pattern of a 2.8 μm film thickness was formed at a predetermined position with respect to the black matrix.

In the same manner, using the pigment dispersion type photo resist for the green (G) light transmissive pattern, a green (G) light transmissive pattern of a 2.6 μm film thickness was formed at a predetermined position with respect to the black matrix.

Furthermore, using the pigment dispersion type photo resist for the blue (B) light transmissive pattern, a blue (B) light transmissive pattern of a 2.3 μm film thickness was formed at a predetermined position with respect to the black matrix so as to produce a coloring layer.

(Formation of the First Retardation Layer)

Using AL1254 (produced by JSR Corporation) as the alignment layer material, by patterning the alignment layer with the flexo printing, and carrying out the rubbing process, a 700 Å thickness alignment layer was formed. Furthermore, the photo polymerizable liquid crystal composition was coated onto the alignment layer using the spin coating method. At the time, the coating operation was carried out so as to have the thickness of the first retardation layer of 2.4 μm on the green light transmissive pattern. Then, by removing the residual solvent in the photo polymerizable liquid crystal composition by heating the substrate with the first retardation layer formed on a hot plate at 100° C. for 5 minutes, a liquid crystal phase appeared. Subsequently, by carrying out the ultraviolet ray irradiation (10 J/cm$^2$, 365 nm), the photo polymerizable liquid crystal composition was cured. Furthermore, by heating on the hot plate at 200° C. for 10 minutes, it was completely cured. The first retardation layer film thickness of the red, green, blue light transmissive patterns was 2.3 μm, 2.4 μm, 2.6 μm, respectively.

(Production of the Color Filter with a Retardation Layer)

Using PURE ACE WR (produced by TEIJIN LIMITED) as the second retardation layer having the inverse dispersion characteristics, to function as a positive A plate, it was attached on the side opposite to the side with the coloring layer formed of the base material.

According to the color filter with a retardation layer accordingly obtained, the wavelength dispersion was reduced.

Example 2

Liquid Crystal Display

In the same manner as in the example 1, a black matrix, a coloring layer and a first retardation layer were formed on a glass substrate. Using the substrate with the coloring layer and the first retardation layer formed, and MLC-6608 (Merck Ltd.) as the liquid crystal material, a liquid crystal cell of a vertical alignment mode was produced. Next, using PURE ACE WR (produced by TEIJIN LIMITED) as the second retardation layer having the inverse dispersion characteristics, it was attached on the side with the first retardation layer formed of the liquid crystal cell. Thereafter, by attaching a polarizing plate on the both sides of the liquid crystal cell so as to have the crossed Nicol state, a liquid crystal display was produced.

The obtained liquid crystal display had the light leakage effectively restrained in the all wavelength range even in the case the visual angle was increased in the black display state so as to provide a high quality display of a high contrast.

Example 3

Color Filter with a Retardation Layer (Preparation of the First Retardation Layer Forming Coating Solution)

A photo polymerizable liquid crystal composition for forming a first retardation layer to function as a positive C plate was prepared by mixing 75 parts by weight of a liquid crystal monomer having a polymerizable acrylate group on the both ends and a spacer between a mesogen in the central part and the acrylates, 1 part by weight of IRGACURE Irg814 (produced by Chiba Speciality Chemicals) as the photo polymerization initiating agent, and 25 parts by weight of a toluene as the solvent.

(Formation of the Coloring Layer)

As the glass substrate, the pigment dispersion type photo resist for the black matrix, and the pigment dispersion type photo resists for the light transmissive patterns of each color of red (R), green (G), blue (B), those same as the example 1 were used.

After washing the glass substrate according to the ordinary method, by coating the pigment dispersion type photo resist for the black matrix onto the glass substrate with a 1.2 μm thickness by the spin coating method, pre-baking with the conditions of 90° C. for 3 minutes, carrying out predetermined pattern exposure (100 mJ/cm$^2$) and spray development using a 0.05% KOH aqueous solution for 60 seconds, and post-baking by the conditions of 200° C. for 30 minutes, a black matrix was formed.

Next, by coating the pigment dispersion type photo resist for the red (R) onto the substrate with the black matrix formed by the spin coating method, pre-baking with the conditions of 80° C. for 5 minutes, and carrying out alignment exposure (300 mJ/cm$^2$) using a predetermined photo mask for a coloring pattern and spray development using a 0.1% KOH aqueous solution for 60 seconds, and post-baking by the conditions of 200° C. for 60 minutes, a red (R) light transmissive pattern of a 2.0 μm film thickness was formed at a predetermined position with respect to the black matrix.

In the same manner, using the pigment dispersion type photo resist for the green (g), a green (G) light transmissive pattern of a 2.6 μm film thickness was formed at a predetermined position with respect to the black matrix.

Furthermore, using the pigment dispersion type photo resist for the blue (B), a blue (B) light transmissive pattern of a 3.3 μm film thickness was formed at a predetermined position with respect to the black matrix so as to produce a coloring layer.

(Formation of the First Retardation Layer)

Using DMAOP; [(3-trimethoxysily)propyl]octadecyl dimethyl ammonium chloride (produced by SIGMA-ALDRICH Corp.) as the alignment layer material, with patterning the alignment layer by the flexo printing on the coloring layer, and carrying out the rubbing process, a 700 Å thickness alignment layer was formed. Furthermore, the photo polymerizable liquid crystal composition was coated onto the alignment layer using the spin coating method. At the time, the coating operation was carried out so as to have the thickness of the first retardation layer of 1.6 μm on the green light transmissive pattern. Then, by removing the residual solvent in the photo polymerizable liquid crystal composition by heating the substrate with the first retardation layer formed on a hot plate at 100° C. for 5 minutes, a liquid crystal phase appeared. Subsequently, by carrying out the ultraviolet ray irradiation (10 J/cm$^2$, 365 nm), the photo polymerizable liquid crystal composition was cured. Furthermore, by heating on the hot plate at 200° C. for 10 minutes, it was completely cured. The first retardation layer film thickness of the red, green, blue light transmissive patterns was 1.9 μm, 1.6 μm, 1.1 μm, respectively.

(Production of the Color Filter with a Retardation Layer)

Using PURE ACE WR (produced by TEIJIN LIMITED) as the second retardation layer having the inverse dispersion characteristics, to function as a positive A plate, it was attached on the side opposite to the side with the coloring layer formed of the base material.

According to the color filter with a retardation layer accordingly obtained, the wavelength dispersion was reduced.

Example 4

Liquid Crystal Display

In the same manner as in the example 3, a black matrix, a coloring layer and a first retardation layer were formed on a glass substrate. Using the substrate with the coloring layer and the first retardation layer formed, a liquid crystal cell of an IPS mode was produced. Next, using PURE ACE WR (produced by TEIJIN LIMITED) as the second retardation layer having the inverse dispersion characteristics, it was attached on the side with the first retardation layer formed of the liquid crystal cell. Thereafter, by attaching a polarizing plate on the both sides of the liquid crystal cell so as to have the crossed Nicol state, a liquid crystal display was produced.

The obtained liquid crystal display had the light leakage effectively restrained in the all wavelength range even in the case the visual angle was increased in the black display state so as to provide a high quality display of a high contrast.

The invention claimed is:

1. A color filter with a retardation layer comprising:
   a substrate;
   a colored layer comprising a plurality of rows of light transmissive patterns, whose thickness differs according to its color, formed on the substrate,
   a first retardation layer formed as one continuous layer, on the colored layer, made of a liquid crystalline polymer, having an optical axis perpendicular to a plane of the substrate so as to function as a C plate; and
   a second retardation layer formed on an opposite side of the substrate to a side with the colored layer formed, or between the substrate and the colored layer, having an optical axis parallel to the plane of the substrate so as to function as a positive A plate having a positive refractive index anisotropy,
   wherein a refractive index anisotropy of the second retardation layer in a visible light range becomes smaller with a shorter wavelength, and
   further wherein a total of a thickness of the colored layer and a thickness of the first retardation layer is constant, and the thickness of the first retardation layer differs according to a thickness of the light transmissive pattern.

2. The color filter with a retardation layer according to claim 1, wherein the colored layer comprises the light transmissive patterns of three colors including red, green and blue, and thicknesses of the light transmissive patterns for the three colors are provided in an order of red>green>blue.

3. The color filter with a retardation layer according to claim 1, wherein the colored layer comprises the light transmissive patterns of three colors including red, green and blue, and thicknesses of the light transmissive patterns for the three colors may be provided in an order of blue>green>red.

4. A liquid crystal display comprising:
   a first polarizing plate and a second polarizing plate with absorption axes provided orthogonal with each other;
   a color filter comprising a substrate, a colored layer comprising a plurality of rows of light transmissive patterns, whose thickness differes according to its color, formed on the substrate, a first retardation layer formed as one continuous layer, on the colored layer, made of a liquid crystalline polymer, having an optical axis perpendicular to a plane of the substrate so as to function as a C plate, provided between the first polarizing plate and the second polarizing plate;
   a second retardation layer, having an optical axis parallel to the plane of the substrate so as to function as a positive A plate having a positive refractive index anisotropy; and
   a liquid crystal layer,
   wherein the first polarizing plate, the second retardation layer, the first retardation layer and the second polarizing plate are formed in this order such that the optical axis of the second retardation layer and an absorption axis of the first polarizing plate are disposed substantially perpendicularly, and a refractive index anisotropy of the second retardation layer in a visible light range becomes smaller with a shorter wavelength, and
   further wherein a total of a thickness of the colored layer and a thickness of the first retardation layer is constant, and the thickness of the first retardation layer differs according to a thickness of the light transmissive pattern.

5. The liquid crystal display according to claim 4, wherein the liquid crystal layer is formed between the color filter and the second polarizing plate, and the second retardation layer is formed on an opposite side of the substrate to a side with the colored layer of the color filter formed, or between the substrate of the color filter and the colored layer.

6. The liquid crystal display according to claim 4, wherein the liquid crystal layer is formed between the second retardation layer and the color filter.

7. The liquid crystal display according to claim 4, wherein the colored layer comprises the light transmissive patterns of three colors including red, green and blue, and thicknesses of the light transmissive patterns for the three colors are provided in an order of red>green>blue.

8. The liquid crystal display according to claim 5, wherein the colored layer comprises the light transmissive patterns of three colors including red, green and blue, and thicknesses of the light transmissive patterns for the three colors are provided in an order of red>green>blue.

9. The liquid crystal display according to claim 6, wherein the colored layer comprises the light transmissive patterns of three colors including red, green and blue, and thicknesses of the light transmissive patterns for the three colors are provided in an order of red>green>blue.

10. The liquid crystal display according to claim 4, wherein the colored layer comprises the light transmissive patterns of three colors including red, green and blue, and thicknesses of the light transmissive patterns for the three colors are provided in an order of blue>green>red.

11. The liquid crystal display according to claim 5, wherein the colored layer comprises the light transmissive patterns of three colors including red, green and blue, and thicknesses of the light transmissive patterns for the three colors are provided in an order of blue>green>red.

12. The liquid crystal display according to claim 6, wherein the colored layer comprises the light transmissive patterns of three colors including red, green and blue, and thicknesses of the light transmissive patterns for the three colors are provided in an order of blue>green>red.

* * * * *